Sept. 18, 1951  G. A. CUMMINS  2,568,488
VARIABLE LENGTH FISH LURE
Filed Dec. 26, 1947
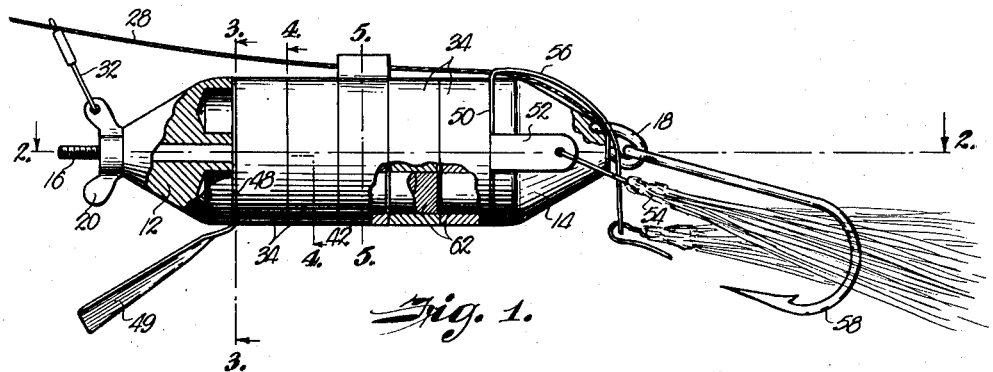
Fig. 1.
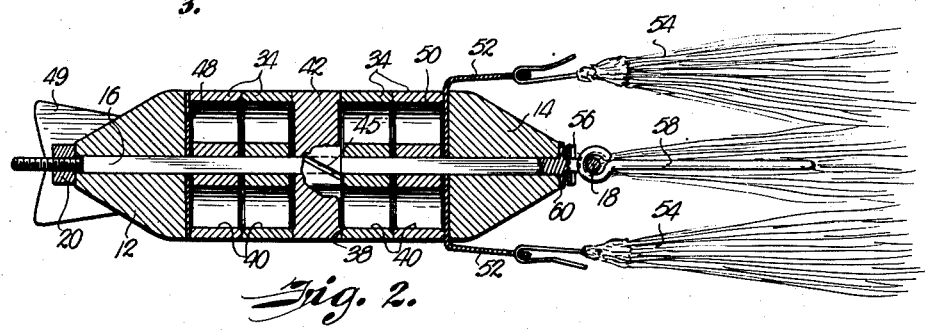
Fig. 2.
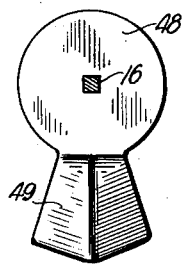
Fig. 3.
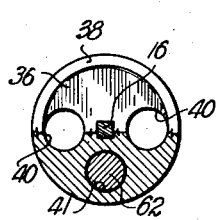
Fig. 4.
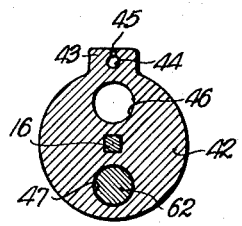
Fig. 5.
Fig. 7.
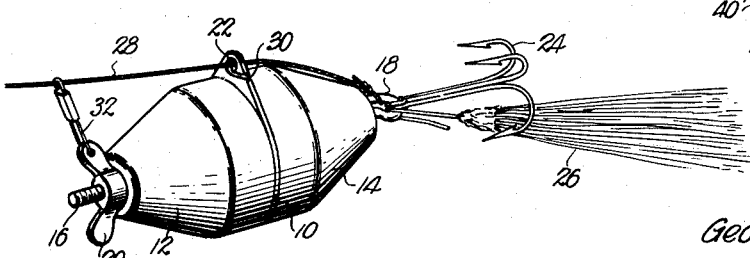
Fig. 6.
INVENTOR.
George A. Cummins
BY Thos. E. Scofield
ATTORNEY.

Patented Sept. 18, 1951

2,568,488

UNITED STATES PATENT OFFICE 2,568,488

VARIABLE LENGTH FISH LURE

George A. Cummins, San Francisco, Calif.

Application December 26, 1947, Serial No. 794,067

9 Claims. (Cl. 43—42.09)

1

The present invention relates in general to lures of the kind employed as artificial bait in fishing, and it deals more particularly with the type of lure commonly designated as a plug.

Broadly speaking it is the object of the invention to provide a bait of this character which is efficient and reliable in operation, attractive in appearance, simple in construction and comparatively inexpensive to manufacture.

Another object is to provide a lure which can readily be changed in form and character for different types of fishing. More specifically it is the object of the invention to provide a plug which is variable in length, variable in weight, variable in color and variable in its action or movement when used in the water.

To this end I provide a lure or plug made up of separable sections, the number of sections used in any case determining the length of the plug. For buoyancy the individual sections are provided with holes or cavities which are covered and sealed when the parts are assembled, forming water-tight air chambers in the plug; weights are provided which are insertable in one or more chambers whereby the lure may be employed either for surface or deep water fishing simply by ballasting it properly.

Certain parts of my lure are interchangeable and may be located at different places or stations in the lure assembly to produce different styles of action when the bait is towed at the end of a fishing line. Also various "action" and "attractor" fittings are readily included or omitted from the assembly at will and may be used in combination with one another if desired.

According to the invention, the sections of my lure assembly may be of any color, all being alike in color or different ones in the assembly being different colors, as preferred. The invention also contemplates the use of transparent lure sections into the cavities of which colored inserts are placed to impart color to the lure due to the optical properties of transparent body sections.

Other features reside in the form, construction and assembly of parts, and these features together with the further objects of the invention will be made clear in the following description.

In the accompanying drawings which form a part of the specification and are to be read in conjunction therewith, and in which like reference numerals are employed to identify like parts of the various views:

Fig. 1 is a side elevational view of one assembled form of my lure with parts broken away for purposes of illustration,

2

Fig. 2 is a horizontal cross-section taken approximately along the line 2—2 of Fig. 1 in the direction of the arrows, Fig. 3 is a vertical cross-section taken along the line 3—3 of Fig. 1 in the direction of the arrows, Fig. 4 is a vertical cross-section taken along the line 4—4 of Fig. 1 in the direction of the arrows, Fig. 5 is a vertical cross-section taken along 5—5 of Fig. 1, Fig. 6 is a perspective view of another assembled form of my lure, and Fig. 7 is an elevational view of one of the spacers employed in my lure, showing a modified form of construction.

The parts of my lure can be assembled in various ways, one of the simplest of which is shown in Fig. 6. Referring to that figure it will be seen that the assembly comprises a thin wafer 10 sandwiched between a pair of tapered members 12 and 14. As will be made clearer presently, these parts are mounted on an elongated rod 16 extending axially through the assembly, which rod has a hook 18 at one end and a wing nut 20 screwed to the other end to clamp the parts together.

At its large inner end each tapered member is generally cylindrical in shape, the adjacent portion preferably comprising a truncated cone or conoid as shown. Wafer 10 is shaped to provide an up-standing ear apertured at 22, the balance of its contour being circular and of a diameter to conform with the large ends of the tapered members.

In use, a single or multiple fish hook 24 is connected to the rear or doubled-back end of rod 16 together with a hair skirt or buck tail 26 if desired. A leader 28, also connected to the rear end of rod 16, extends forwardly through the aperture or eye 22 (which is provided with a narrow slot 30 to facilitate the threading thereof) and is fastened to the trailing end of the fish line. As the lure is drawn through the water, it will be noted that the motive force is applied not to the forward or leading end of the lure as is conventional but to the trailing end; in effect, it is pushed through the water and since the leader passes through eye 22 this serves as a pivot point about which the lure tends to oscillate or wobble from side to side as it advances. To limit the extent of the side-wise oscillation, the forward end of the lure is loosely connected to the leader 28 by means of an auxiliary leader or arc control link 32 having one end connected to wing nut 20 and the other to the main leader 28. With the wing nut occupying the position shown, as is normal, the lure in its oscillation will deviate equally to either side of center, but if the wing nut is turned 45 degrees or a fraction thereof in either direction, the deviation to one side will be more pronounced than to the other, which is advantageous in some instances.

My lure can be made longer than shown in Fig. 6 simply by employing a longer axial rod 16 and inserting between the tapered end members 12 and 14 one or more spacing disks 34, the preferred form of which is shown in Figs. 1, 2 and 4. It is contemplated that rod 16 may be supplied in multiple lengths, one rod for each of the varied lengths of lure deemed practical and thus advisable to assemble.

As best seen in Figs. 2 and 4, the opposite sides of the disks are dished or concaved as at 36 to provide marginal rims 38, the rims of adjacent disks seating against one another to provide a water-tight joint when the disks are assembled side by side. Each disk has a small aperture, square in shape, to receive the square shank of rod 16; on either side of the central aperture are a pair of larger holes 40 while a third hole 41 is spaced radially from the center and equidistant between holes 40. Hole 41 preferably is round in shape while the diametrically opposite holes 40 may either be round or oblong (see 40', Fig. 7). When properly assembled on rod 16, the disks have their corresponding holes in alignment, such alignment being preserved by a square cross-section of the rod and the registering central apertures of the disk which prevents rotation of the disks relative to the rod.

In the assembly shown in Figs. 1 and 2, the central spacer 42 differs from disks 34 in that it has a radially extending projection 43 containing a leader eye 44. A diagonal slot 45 communicates with the eye to facilitate threading a leader therethrough. On a diametrical line with the projection there are a pair of holes 46 and 47 spaced on either side of a central square aperture, these holes extending through the spacer from face to face; opposite faces of the member are concaved or dished as hereinbefore described so that only the annular margin of the spacer engages adjacent disks.

Clamped between the forward tapered member 12 and the adjoining spacer disk 34 there is a circular wafer 48 having an integral downwardly and forwardly projecting deep-runner lip 49. At the other end of the lure between the rear tapered member 14 and the adjoining disk there is a similar wafer 50 having laterally projecting ears 52 bent back and apertured at their trailing ends to receive buck tails or hair skirts 54. From the top of the wafer a strip 56 extends rearwardly and downwardly, this strip containing a narrow longitudinal slot of sufficient length to permit hook 18 to project therethrough. At its tip the strip 56 is apertured to receive a buck tail as shown in Fig. 1.

A single or multiple fish hook such as 58 may be fastened to the lure simply by backing off the wing nut 20 and sliding rod 16 axially to the right until the tip of hook 18 is clear of the strip 56. The eye of the fish hook then is slipped over the open end of hook 18 and the wing nut 20 again tightened to advance the tip of hook 18 through the slot in strip 56 and into the shallow channel provided at the rear of member 14 for receiving same (see Fig. 1), after which it is impossible for the fish hook to become detached.

The end of the leader 28 also is connected to hook 18 and extends forwardly through eye 44 to the end of the fish line. The wobble action or compound side wise oscillation of the lure will be understood from the previous explanation, this movement being limited as in the case of the Fig. 6 structure by means of an auxiliary arc-control leader 32 extending from the wing nut 20 to the main leader 28. Although this is the preferred way of fastening my lure to the line, leader 28 obviously can be fastened to the forward end of the lure in conventional fashion in the event such is desirable.

It will be clear that my lure may be assembled with as many spacing disks 34 as desired between the end members 12 and 14 and that the leader guides 10 and 42 may be employed interchangeably in the assembly according to the fisherman's preference. Thus the plug may be varied in length at will. In an assembly having a plurality of spacers as shown in Figs. 1 and 2 the leader guide 42 may be arranged in the center of the lure or it may be positioned off-center by arranging more disks 34 behind the guide than in front of it, or vice versa; this alters the point about which the lure oscillates or wobbles as it is drawn through the water, and considerable variation in the movement of the device may be obtained in this fashion.

The action of the device also can be altered materially by reversing disk 48 relative to the balance of the assembly so that the lip 49 trails rearwardly instead of extending forwardly as shown. As a matter of fact, the deep runner 49 can be omitted entirely from the assembly if desired or can be replaced by an action fitting of a different shape. Member 50 also can be omitted if preferred and if omitted, a buck tail can be fastened to the loop or eye 18 along with the fish hook.

In addition to the foregoing variations in assembly it is possible to adapt my lure readily for either shallow fishing or deep water fishing. In this connection it should be noted that when the tapered end members 12 and 14 and any intermediate spacers employed in the assembly are clamped tightly together, the communicating holes in these parts form water-tight chambers giving the lure buoyancy even though the parts be made of material having a specific gravity heavier than that of water. A shoulder 60 on rod 16 serves as a stop for rear member 14 and this assists wing nut 20 in clamping the members with the requisite tightness to make the joints between adjacent parts water-tight.

When assembling the lure for use as a deep water bait, the holes 41 in spacing disks 34 are aligned with the bottom hole 47 in the leader guide and a heavy ballast means introduced therein. This ballast may comprise a series of short cylindrical weights or slugs 62 placed end to end, the axial dimension of each slug being equal to the thickness of one spacing member 34; or, alternatively, the ballast may comprise a single rod extending through the aligned holes from on end of the lure to the other. Assuming the ballast material to be heavier than the material making up the body of the lure as is intended to be the case, it will be clear that the lure's center of gravity is below its geometric axis and hence that there is no tendency for the lure to roll or rotate about such axis. The device can be further weighted, if desired, by inserting additional ballast slugs in the side holes 40; and these may be made of the same heavy material as slug 62 or they may be made of somewhat lighter material.

When the weights are omitted with a view to using the lure as a top-water bait, holes 41 in spacing member 34 preferably are aligned with the upper hole 46 in the leader guide thereby to maintain the center of gravity of the assembly below its geometric axis.

The tapered end members 12 and 14, the spacer disks 34 and the leader guide 42 can be made of various materials. It is preferred however to mold them out of clear or colored plastic and it is contemplated that the parts assembled to form a lure may all be of the same color or may be of different colors to present a variegated appearance. When clear plastic parts are used, color can be imparted thereto by the use of colored inserts in the aligned holes; for instance the ballast slugs may be of brushed brass or stainless steel whereupon due to the optical properties of the plastic, the body of the lure will assure a gold or silver color.

From the foregoing it will be seen that this invention is one well adapted to attain all the ends and objects hereinbefore set forth together with other advantages which are objects and which are inherent to the device.

It will be understood that certain features and subcombinations are of utility and may be employed without reference to other features and subcombinations. This is contemplated by and is within the scope of appended claims.

Inasmuch as many possible embodiments of the invention may be made without departing from the scope thereof, it is to be understood that all matter herein set forth or shown in the accompanying drawings is to be interpreted as illustrative and not in a limiting sense.

Having thus described my invention, I claim:

1. In a fish lure, interchangeable perforate disks, a pair of end members, and means for clamping the disks between the end members to form an elongated body wherein the perforations in the disks are aligned to form three chambers disposed lengthwise of the body, two of the chambers being on the same level as the longitudinal axis of the body and the third chamber being vertically aligned with said axis.

2. A lure as in claim 1 wherein said third chamber is above the axis of the body.

3. A lure as in claim 1 wherein said third chamber is below the axis of the body and contains removable ballast material.

4. In a fish lure, a plurality of centrally apertured disks mounted on a rod, said rod and said apertures being non-circular whereby said disks are non-rotatable relative to one another, and means on the rod for clamping the disks tightly together in abutting relation, said disks having registering off-center perforations communicating with one another when the disks are clamped together to form a buoyancy chamber whose axis is parallel to the axis of said rod but spaced radially therefrom.

5. A lure as in claim 4 wherein at least one face of each disk is concave so only the rim of the face seats against the adjoining disk.

6. In a fish lure, a plurality of centrally apertured disks mounted on a rod, said rod and said apertures being non-circular whereby said disks are non-rotatable relative to one another, means on the rod for clamping the disks tightly together in abutting relation, said disks having registering off-center perforations communicating with one another when the disks are clamped together thereby to form an elongated chamber whose axis is parallel to the axis of said rod but spaced radially therefrom, and a removable ballast material in said chamber.

7. A lure as in claim 6 wherein said ballast material comprises a plurality of weights each conforming in cross section with the transverse cross section of said chamber.

8. In a fish lure, a plurality of centrally apertured disks mounted on a rod, said rod and said apertures being non-circular whereby said disks are non-rotatable relative to one another, and means on the rod for clamping the disks tightly together in abutting relation, said disks having registering off-center perforations communicating with one another when the disks are clamped together to form an elongated chamber whose axis is parallel to the axis of said rod but spaced radially therefrom, said disks also having registering off-center perforations communicating with one another when the disks are clamped together to form a second elongated chamber whose axis is parallel to the axis of the rod but spaced radially therefrom, the axes of said rod and said chambers being disposed in the same plane with the axis of the rod between the two chambers.

9. A lure as in claim 8 wherein one of said chambers contains a removable ballast material, the other of said chambers being a buoyancy chamber.

GEORGE A. CUMMINS.

REFERENCES CITED

The following references are of record in the file of this patent:

UNITED STATES PATENTS

| Number | Name | Date |
|---|---|---|
| 251,087 | Austin | Dec. 20, 1881 |
| 679,721 | Bristol | Aug. 6, 1901 |
| 1,333,154 | Buddle | Mar. 9, 1920 |
| 1,480,099 | Murphy | Jan. 8, 1924 |
| 1,606,877 | Howe | Nov. 16, 1926 |
| 1,792,989 | LaGue | Feb. 17, 1931 |
| 1,833,241 | Wright | Nov. 24, 1931 |
| 1,867,458 | Keuper | July 12, 1932 |
| 1,892,892 | Jamar | Jan. 3, 1933 |
| 1,941,370 | Vann | Dec. 26, 1933 |
| 1,972,697 | Walsh | Sept. 4, 1934 |
| 1,993,798 | Peterson | Mar. 12, 1935 |
| 2,218,421 | Edgar | Oct. 15, 1940 |
| 2,226,331 | Allison | Dec. 24, 1940 |
| 2,288,595 | Peterson | July 7, 1942 |
| 2,415,692 | Huston | Feb. 11, 1947 |